United States Patent [19]
Mihayashi et al.

[11] Patent Number: 5,883,141
[45] Date of Patent: Mar. 16, 1999

[54] PROCESS FOR PREPARING POLYOLEFIN RESIN PRE-EXPANDED PARTICLES

[75] Inventors: Tsuyoshi Mihayashi; Hideshi Ito, both of Settsu, Japan

[73] Assignee: Kaneka Corporation, Osaka, Japan

[21] Appl. No.: 45,894

[22] Filed: Mar. 23, 1998

[30] Foreign Application Priority Data

Mar. 25, 1997 [JP] Japan ................................ 72225/1997

[51] Int. Cl.$^6$ .................................. C08J 9/22; C08J 9/224
[52] U.S. Cl. ............................... 521/58; 521/60; 521/56; 521/59; 264/DIG. 9
[58] Field of Search .................................. 521/56, 58, 59; 54/60

[56] References Cited

U.S. PATENT DOCUMENTS

| | | | |
|---|---|---|---|
| 4,704,239 | 11/1987 | Yoshimura et al. | 521/58 |
| 4,861,531 | 8/1989 | Maeda | 521/60 |
| 5,071,883 | 12/1991 | Kuwabara et al. | 521/60 |
| 5,459,169 | 10/1995 | Tokoro et al. | 521/60 |
| 5,679,450 | 10/1997 | Tokoro et al. | 521/60 |
| 5,747,549 | 5/1998 | Tsurugai et al. | 521/60 |

*Primary Examiner*—Morton Foelak
*Attorney, Agent, or Firm*—Armstrong, Westerman, Hattori, McLeland & Naughton

[57] ABSTRACT

A process for preparing polyolefin resin pre-expanded particles comprising imparting expandability to polyolefin resin expanded particles having a crystal structure which shows two melting points in a DSC curve and heat expanding expanded particles having expandability, in which the relation between heat expansion temperature and the amount of a fusion preventing agent being attached to the surface of the polyolefin resin expanded particles is represented by the inequality: $t-T_V \leq 49.1C-27.0$ (t is heat expansion temperature, C is the amount of the fusion preventing agent being attached to the surface of the polyolefin resin expanded particles and $T_V$ is saddle temperature between two peaks showing two respective melting points in the DSC curve), and t is within the temperature range represented by the inequality: $T_L-30 \leq t \leq T_V$ ($T_V$ is the same as defined above and $T_L$ is lower melting point of the two melting points). According to the process, mutual fusion of the expanded particles and increase of open cell ratio of the pre-expanded particles can be prevented at the same time, expansion efficiency can be increased, and polyolefin resin pre-expanded particles having high expansion ratio can be prepared.

4 Claims, 2 Drawing Sheets

PROCESS FOR PREPARING POLYOLEFIN RESIN PRE-EXPANDED PARTICLES

BACKGROUND OF THE INVENTION

The present invention relates to a process for preparing polyolefin resin pre-expanded particles, and more particularly to a process for preparing polyolefin resin pre-expanded particles which can be preferably used as, for instance, a raw material for an internal die expansion molded article.

Conventionally, when polyolefin resin pre-expanded particles are prepared, there is well known a process for preparing polyolefin resin expanded particles, comprising dispersing resin particles together with a dispersant into an aqueous disperse medium in a closed container, introducing a volatile blowing agent thereto, then heating the resin particles to at lowest softening temperature of the polyolefin resin and releasing the resin particles into a lower pressure atmosphere than internal pressure of the closed container.

For instance, there is already published a process for preparing polyolefin resin pre-expanded particles having a special crystal structure which shows two melting points in a DSC curve obtained by a differential scanning calorimetry, by using the above process for preparing polyolefin resin expanded particles (see, for instance, Japanese Unexamined Patent Publication No. 176336/1984 and Japanese Unexamined Patent Publication No. 183832/1988). Furthermore, there is already published a method for improving expansion ratio of the above polyolefin resin pre-expanded particles having a special crystal structure with retaining a closed cell structure. In this method, expandability is imparted to the polyolefin resin pre-expanded particles and then, the particles are heated (see Japanese Unexamined Patent Publication No. 23428/1985 and Japanese Unexamined Patent Publication No. 90228/1985).

In Japanese Unexamined Patent Publication No. 23428/1985, there is disclosed a process for preparing pre-expanded particles having higher expansion ratio than that of base non-crosslinked propylene random copolymer pre-expanded particles having a specific range of expansion ratio and cell number and having a crystal structure which shows higher temperature peak on a higher temperature point than a point of intrinsic peak of the base resin in a DSC curve. In this process, expandability is imparted to the non-crosslinked propylene random copolymer pre-expanded particles and then, the particles are heat expanded.

In Japanese Unexamined Patent Publication No. 90228/1985, there is disclosed a method comprising a step of imparting expandability to polypropylene resin pre-expanded particles having the same special crystal structure as that of the pre-expanded particles disclosed in Japanese Unexamined Patent Publication Nos. 176336/1984 and 183832/1988 and having decreasing speed coefficient of internal pressure "k" of at most 0.30, a step of heating the polypropylene resin pre-expanded particles in a closed container to temperature "T" (° C.) represented by the inequality:

$$Tm-65<T<Tm-30$$

wherein Tm is melting finishing temperature of the base resin, a step of keeping as it is, a step of opening the edge of the container and a step of releasing the polypropylene resin pre-expanded particles into a lower pressure atmosphere than internal pressure of the container.

However, all technologies in these methods relate to a polypropylene resin, in particular, ethylene-propylene random copolymer. Accordingly, technologies using the other polyolefin resin are not disclosed.

As to heat temperature of the pre-expanded particles, as usual, it is described that vapor having vapor pressure of 0.8 to 1.5 kg/cm²(G) (116°~127° C.) or hot air having temperature of at lowest 100° C. is preferably used (see Japanese Unexamined Patent Publication No. 23428/1985). Also, it is described that the pre-expanded particles are heated at temperature "T" (° C.) represented by the inequality:

$$Tm-65<T<Tm-30$$

wherein Tm is melting finishing temperature of the base resin (see Japanese Unexamined Patent Publication No. 90228/1985). However, although the pre-expanded particles having a special crystal structure are used, it is not disclosed that crystal characteristic of the pre-expanded particles is related to heat temperature of the pre-expanded particles to accomplish the objects.

During heat expansion of the thus polyolefin resin expanded particles, in the case that heat temperature of the expanded particles is too high, open cell ratio of the obtained pre-expanded particles increases. In the case that the thus obtained pre-expanded particles are used for internal die mold, it is forecasted that mechanical strength of the produced molded article remarkably lowers or mutual fusion of the expanded particles is generated to cause short shot during feeding of the expanded particles into a molding machine. These phenomena are mentioned in the above Publications.

Then, the inventors of the present invention have earnestly studied as to heat expansion and carried out the following examination. An ethylene-propylene random copolymer having the above temperature "Tm" of 157° C. was used as a base resin and subjected to the general procedure to give expanded particles. The obtained expanded particles were sufficiently washed with water and an acidic aqueous solution to give expanded particles having the above special crystal structure (expansion ratio: 11.3 times, average cell diameter: 300 µm, decreasing speed coefficient of internal pressure "k": 0.15). The obtained expanded particles having the special crystal structure were heat expanded with vapor having vapor pressure of 1.5 kg/cm²(G) (about 126° C.) to give pre-expanded particles (expansion time: 30 seconds). However, although pre-expanded particles having high expansion ratio and a closed cell structure could be certainly prepared, mutual fusion of the expanded particles was generated to cause short shot of the expanded particles during molding.

When pre-expanded particles are prepared by a heat expansion method, as one of the effective means for heightening expansion ratio of the obtained pre-expanded particles, it can be proposed that a resin layer on the surface of expanded particles is softened together with heightening heat temperature and internal pressure of the expanded particles. However, in the case that mutual fusion of the expanded particles is once generated as mentioned above, substantially, heat temperature cannot be heightened any more, so that expansion ratio of the obtained pre-expanded particles cannot be heightened.

On the other hand, in a process for producing a polyolefin resin expansion molded article comprising filling a molding machine with the above pre-expanded particles having the special crystal structure and subjecting the pre-expanded particles to heat fusion with vapor to give an expansion molded article having the desired shape, the amount of attachment on the surface of the pre-expanded particles is known as one of factors exerting an influence upon molding fusion property (see, for instance, Japanese Unexamined Patent Publication No. 57838/1992).

That is, in a process for preparing polyolefin resin expanded particles comprising dispersing polyolefin resin particles into an aqueous disperse medium in a closed container, introducing a volatile blowing agent thereto, then heating the resin particles to at lowest softening temperature of the polyolefin resin and releasing the resin particles into a lower pressure atmosphere than internal pressure of the closed container, inorganic powder which is called dispersant or fusion preventing agent is added to the aqueous disperse medium together with the polyolefin resin particles, the inorganic powder is attached to the surface of the polyolefin resin particles to prevent mutual fusion of the resin particles in the aqueous disperse medium, and this surface attachment is washed and removed during or after preparation of pre-expanded particles to improve molding fusion property.

For instance, in the process described in Japanese Unexamined Patent Publication No. 57838/11992, 3 parts (parts by weight, hereinafter referred to the same) of powdery tricalcium phosphate as a dispersant and 0.12 part of sodium n-paraffinsulfonate are added to 100 parts of ethylene-propylene random copolymer pellet, and a method for washing pre-expanded particles just after preparation is changed, so that the amount of attachment (mainly, tricalcium phosphate) on the surface of the pre-expanded particles is changed. However, in the case that the amount of this attachment is at least 3300 ppm, there is a problem that molding fusion property remarkably lowers, so melt bonding ratio of the obtained molded article becomes 0%. This problem is pointed out in this Publication.

Then, the inventors of the present invention have firstly considered that mutual fusion of expanded particles during heat expansion can be prevented or restrained in accordance with adjustment of the amount of attachment on the surface of the pre-expanded particles. So, by the inventors, there has been carried out heat expansion experiment comprising increasing the amount of attachment on the surface of the base expanded particles under the entirely same condition as in the case that mutual fusion of expanded particles has been generated at vapor pressure of 1.5 kg/cm$^2$(G) during the above heat expansion. As a result, it has been found that mutual fusion of expanded particles has not been generated even at vapor pressure of 3 kg/cm$^2$(G) (=143° C.).

In addition, by using the other polyolefin resin or composition thereof, such as ethylene-propylene random copolymer, ethylene-α-olefin copolymer or a resin composition prepared by adding an ethylene ionomer to ethylene-α-olefin copolymer, which has different melting finishing temperature each other, the same experiment as mentioned above has been carried out. As a result, it has been found that at lower temperature than $T_L$−30 (° C.) ($T_L$: lower melting point of the two melting points of base pre-expanded particles), expansion ratio by heat expansion has been improved only a little. Also, it has been found that at higher temperature than $T_V$ (° C.) ($T_V$: saddle temperature between two peaks showing two respective melting points), mutual fusion of expanded particles has been generated having no relation to melting finishing temperature of base resin (composition) or no relation to the amount of attachment on the surface of base expanded particles, or open cell ratio of the obtained pre-expanded particles has become at least 20% by heat expansion. Accordingly, it has been found that retention of good moldability has been difficult.

Furthermore, at the temperature range from $T_L$−30 (° C.) to $T_V$ (° C.), there has been examined the relation between the amount of attachment on the surface of the expanded particles and t (° C.) (t: heat expansion temperature at which mutual fusion of expanded particles has been generated). As a result, as to all kinds of polyolefin resin expanded particles, surprisingly, it has been found that there has been the linear relation between the upper limit of the temperature represented by t−$T_V$ (° C.) (at the same temperature as this upper limit or higher temperature than this upper limit, mutual fusion of expanded particles has been generated) and the amount of a fusion preventing agent being attached to the surface of the expanded particles, so that the present invention has been completed.

The present invention has been accomplished in consideration of the above knowledge.

An object of the present invention is to provide a process for preparing polyolefin resin pre-expanded particles having high expansion ratio with retaining closeness of cell and without generation of mutual fusion of expanded particles in accordance with a heat expansion method by using the above polyolefin resin expanded particles having a special crystal structure.

This and other objects of the present invention will become apparent from the description hereinafter.

SUMMARY OF THE INVENTION

In accordance with the present invention, there is provided a process for preparing polyolefin resin pre-expanded particles comprising imparting expandability to polyolefin resin expanded particles having a crystal structure which shows two melting points in a DSC curve obtained by a differential scanning calorimetry and then, heat expanding expanded particles having expandability, which is characterized in that the relation between heat expansion temperature of the above expanded particles having expandability and the amount of a fusion preventing agent being attached to the surface of the polyolefin resin expanded particles is represented by the inequality (I):

$$t-T_V \leq 49.1C-27.0 \quad\quad\quad (I)$$

wherein t (° C.) is heat expansion temperature, C (phr) is the amount of the fusion preventing agent being attached to the surface of the polyolefin resin expanded particles and $T_V$ (° C.) is saddle temperature between two peaks showing two respective melting points in the DSC curve, and the heat expansion temperature is within the temperature range represented by the inequality (II):

$$T_L-30 \leq t \leq T_V \quad\quad\quad (II)$$

wherein t (° C.) is heat expansion temperature, $T_V$ (° C.) is saddle temperature between two peaks showing two respective melting points in the DSC curve and $T_L$ (° C.) is lower melting point of the two melting points, the process as defined above, wherein the amount of the fusion preventing agent being attached to the surface of the polyolefin resin expanded particles is 0.001 to 0.3 phr, and the process as defined above, wherein the fusion preventing agent mainly consists of tricalcium phosphate.

DETAILED DESCRIPTION

The process for preparing polyolefin resin pre-expanded particles of the present invention comprises, as mentioned above, imparting expandability to polyolefin resin expanded particles having a crystal structure which shows two melting points in a DSC curve obtained by a differential scanning calorimetry and then, heat expanding expanded particles having expandability, and is characterized in that the relation between heat expansion temperature of the above expanded particles having expandability and the amount of a fusion preventing agent being attached to the surface of the polyolefin resin expanded particles is represented by the inequality (I):

$$t - T_V \leq 49.1C - 27.0 \quad (I)$$

wherein t (° C.) is heat expansion temperature, C (phr) is the amount of the fusion preventing agent being attached to the surface of the polyolefin resin expanded particles and $T_V$ (° C.) is saddle temperature between two peaks showing two respective melting points in the DSC curve, and the heat expansion temperature is within the temperature range represented by the inequality (II):

$$T_L - 30 \leq t \leq T_V \quad (II)$$

wherein t (° C.) is heat expansion temperature, $T_V$ (° C.) is saddle temperature between two peaks showing two respective melting points in the DSC curve and $T_L$ (° C.) is lower melting point of the two melting points.

In the present invention, the above differential scanning calorimetry is carried out in the same manner as in, for instance, Japanese Unexamined Patent Publication No. 23428/1985, Japanese Unexamined Patent Publication No. 90228/1985 and the like. In accordance with the differential scanning calorimetry, crystallization property of expanded particles is examined by using a differential scanning calorimeter with raising the temperature of the expanded particles to 220° C. at a rate of 10° C./min.

Figure 2:
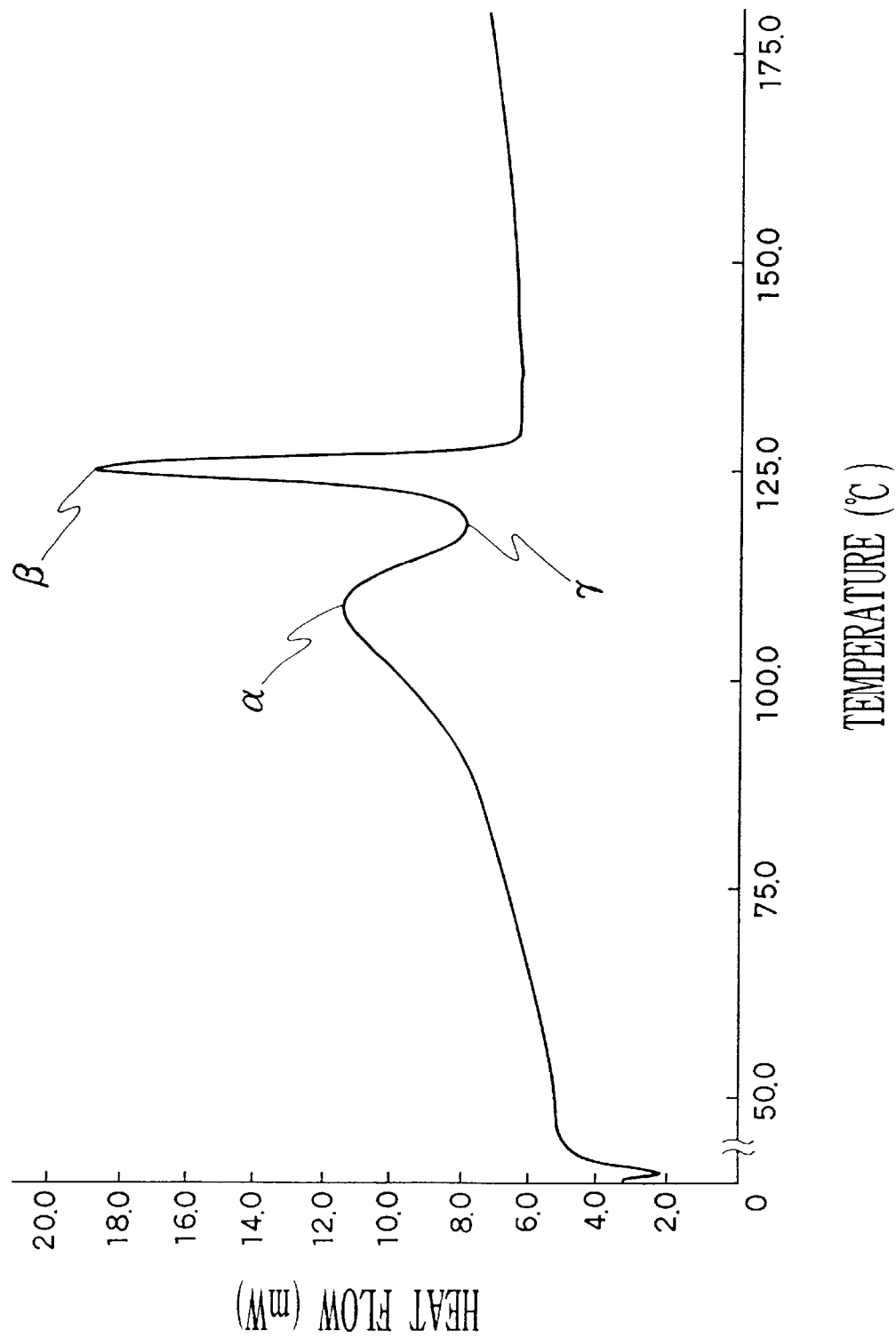
FIG. 2 is a DSC curve of the polyolefin resin expanded particles used in Examples 7 to 8 and Comparative Example 8, which was obtained by a differential scanning calorimetry.

The polyolefin resin expanded particles used in the present invention have, as shown in a graph of FIG. 2, two endothermic peaks (melting points) owing to crystallization in the DSC curve obtained by the above differential scanning calorimetry. As to these two peaks, when lower temperature peak (melting point) is represented as "$T_L$" (° C.) (mark "α" in FIG. 2) and higher temperature peak (melting point) is represented as "$T_H$" (° C.) (mark "β" in FIG. 2), as usual, the difference between these two melting points "$T_H - T_L$" is 5° to 20° C. or so. Also, as shown in FIG. 2, a curve consisting of these two peaks looks like a saddle of horse as a whole. In this saddle, the other extreme value appears on the most heat releasing point of the DSC curve. In the present invention, the temperature at which this extreme value appears is defined as saddle temperature "$T_V$" (° C.) (mark "γ" in FIG. 2).

The polyolefin resin expanded particles having the above specific crystal structure can be prepared by expanding polyolefin resin particles for expansion with a blowing agent.

Examples of the above polyolefin resin are, for instance, a propylene resin such as polypropylene, ethylene-propylene random copolymer, ethylene-propylene block copolymer or ethylene-propylene-α-olefin terpolymer; an ethylene resin such as linear low density polyethylene, low density polyethylene or high density polyethylene; and the like. In order to retain mechanical strength of molded articles produced by using the pre-expanded particles, there is suitably used a polyolefin resin having the endothermic amount in the whole of the peaks containing two melting points of at least 30 J/g, preferably at least 50 J/g and showing crystallinity in accordance with the differential scanning calorimetry of the expanded particles used for heat expansion. Also, in consideration of balance of physical properties other than mechanical strength of the molded articles, and fusion property and the extent of proper range during molding, ethylene-propylene random copolymer and linear low density polyethylene can be, in particular, preferably used.

As far as physical properties of the obtained expanded particles, pre-expanded particles and molded articles are not remarkably lowered, as an expansion nucleating agent, hydrophilic substances such as hydrophilic inorganics and hydrophilic organic compounds can be added to the polyolefin resin.

As mentioned below, during heat expansion, in the case that water and/or alcohol are included in the expanded particles and utilized as an auxiliary blowing agent, heat expansion efficiency can be more improved. Because the polyolefin resin shows hydrophobic property, in the case that the above hydrophilic substances are added to the polyolefin resin, water and/or alcohol which are auxiliary blowing agents can be easily included in the expanded particles.

Examples of the hydrophilic inorganics are, for instance, talc, silica, borax, sodium phosphate and the like. Examples of the hydrophilic organic compounds are, for instance, a water absorbing polymer such as crosslinked poly(sodium acrylate), an ethylene ionomer and the like. It is desired that the amount of the hydrophilic substances is 0.001 to 20 parts or so based on 100 parts of the polyolefin resin.

Polyolefin resin particles for expansion can be prepared, for instance, by adding the hydrophilic substances to the polyolefin resin and melt kneading them by means of a single screw extruder or a twin screw extruder.

Then, a blowing agent and a fusion preventing agent are added to the resin particles for expansion and then, these components are fed into a closed container and expanded under suitable condition, so that there can be prepared polyolefin resin expanded particles having the above specific crystal structure. The fusion preventing agent is attached to the surface of the polyolefin resin expanded particles.

As the blowing agent, there can be exemplified a blowing agent used for imparting expandability to the polyolefin resin expanded particles as mentioned below. The amount of the blowing agent is suitably adjusted so that the polyolefin resin expanded particles have the desired expansion ratio. For instance, it is desired that the amount of the blowing agent is 0.1 to 30 parts or so based on 100 parts of the resin particles for expansion.

As the fusion preventing agent, there can be exemplified every substance which is conventionally used as a dispersant or a fusion preventing agent. Examples of the fusion preventing agent are, for instance, fine granular aluminium oxide, tricalcium phophate, calcium carbonate, magnesium carbonate, kaolin, bentonite and the like. These can be used alone or in an admixture thereof. Among them, tricalcium phophate is particularly preferable because fusion preventing effect is excellent. The amount of the fusion preventing agent is suitably adjusted so that the amount of the fusion preventing agent being attached to the surface of the polyolefin resin expanded particles is within the range as mentioned below.

To the resin particles for expansion, there can be suitably added, for instance, an auxiliary dispersant such as sodium n-paraffinsulfonate, sodium dodecylbenzenesulfonate, benzalkonium chloride or alkyltrimethylammonium chloride.

In order to sufficiently exhibit mutual fusion preventing effect of the expanded particles within the suitable temperature range for heat expansion, it is desired that the amount of the fusion preventing agent being attached to the surface of the thus obtained polyolefin resin expanded particles is at least 0.001 phr, preferably at least 0.005 phr. When the amount of the above fusion preventing agent is too much, although mutual fusion of the expanded particles during heat expansion can be almost completely prevented, fusion property during molding of the obtained pre-expanded particles is remarkably lowered, so that the pre-expanded particles must be washed before molding. Accordingly, in order to remove the fear of washing the pre-expanded particles, it is desired that the amount of the fusion preventing agent being attached to the surface of the polyolefin resin expanded particles is at most 0.3 phr, preferably at most 0.15 phr, more preferably at most 0.13 phr.

As to $T_L$, $T_H$ and $T_V$ in the DSC curve of the above polyolefin resin expanded particles, it is desired that, as usual, $T_L$ is 90° to 160° C. or so, $T_H$ is 110° to 180° C. or so and $T_V$ is 95° to 175° C. or so. Also, as to the polyolefin resin expanded particles, it is desired that expansion ratio is 2 to 30 times or so and average cell diameter is 10 to 500 μm or so.

Then, expandability is imparted to the polyolefin resin expanded particles.

A method for imparting expandability to the expanded particles is not particularly limited. In accordance with the conventionally known methods, expandability can be imparted to the expanded particles. For instance, in the polyolefin resin expanded particles to be used for heat expansion is included a blowing agent of which boiling point is lower than heat expansion temperature and which cannot dissolve the polyolefin resin in a suitable amount, so that expandability can be imparted to the polyolefin resin expanded particles. As the blowing agent, for instance, air and an inorganic gas such as nitrogen gas or carbonic acid gas are particularly preferable because these have generality, no combustibility and no toxicity, and because these are gases during heat expansion, so it is easy to retain high internal pressure of the expanded particles. Also, there can be utilized various compounds which are conventionally widely used for preparing polyolefin resin pre-expanded particles, such as lower aliphatic hydrocarbons such as propane, butane, isobutane, pentane, isopentane and cyclopentane; and halogenated hydrocarbons. In consideration of, in particular, prevention of destruction of ozone layer, among the halogenated hydrocarbons, a compound having no chlorine in its molecule, so-called third generation flon, is preferable. The amount of the blowing agent is not particularly limited. It is desired that, as usual, the amount of the blowing agent is suitably adjusted so that the internal pressure of the expanded particles during heat expansion is 0.1 to 30 kg/cm² (G) or so.

In the present invention, water and/or alcohol can be suitably used as an auxiliary blowing agent. Although vapor pressure during heat expansion is low, expansion efficiency can be more heightened when water and/or alcohol are utilized as an auxiliary blowing agent.

Then, the thus obtained expanded particles having expandability are heated to give polyolefin resin pre-expanded particles.

As a method for heat expanding the expanded particles having expandability, there can be employed, for instance, a method comprising using hot air or vapor. As disclosed in Japanese Unexamined Patent Publication No. 133233/1984, a method comprising using vapor is particularly preferable because quantity of heat can be quickly imparted to the expanded particles having expandability and productivity can be improved. When vapor is used, heating time may be, as usual, one minute or so.

The process of the present invention is greatly characterized in that the relation between heat expansion temperature of the expanded particles having expandability and the amount of the fusion preventing agent being attached to the surface of the polyolefin resin expanded particles is specific, and the relation between the heat expansion temperature and "$T_V$" and "$T_L$" is specific.

The relation between the heat expansion temperature of the expanded particles having expandability and the amount of the fusion preventing agent being attached to the surface of the polyolefin resin expanded particles is, as mentioned above, represented by the inequality (I):

$$t - T_V \leq 49.1C - 27.0 \tag{I}$$

wherein t (° C.) is heat expansion temperature, C (phr) is the amount of the fusion preventing agent being attached to the surface of the polyolefin resin expanded particles and $T_V$ (° C.) is saddle temperature between two peaks showing two respective melting points in the DSC curve, and the above heat expansion temperature "t" is within the temperature range represented by the inequality (II):

$$T_L - 30 \leq t \leq T_V \tag{II}$$

wherein $T_V$ is the same as defined above and $T_L$ (° C.) is lower melting point of the above two melting points.

The heat expansion temperature "t" is "$T_L$–30" (° C.) or higher than "$T_L$–30" (° C.), preferably "$T_L$–25" (° C.) or higher than "$T_L$25" (° C.), and "t" is "$T_V$" (° C.) or lower than "$T_V$" (° C.), preferably "$T_V$–2" (° C.) or lower than "$T_V$–2" (° C.).

It is not desired that "t" is lower than the above lower limit "$T_L$30" because resin layer which composes the expanded particles is hard, expansion efficiency "ε" lowers and the ratio of expansion ratio before heat expansion to expansion ratio after heat expansion becomes small when heat temperature is too low.

Expansion efficiency "δ" is calculated in accordance with the following equation (III):

$$\frac{K - K_o}{K_o} = \epsilon \left( P_o \frac{T}{Tr} - 1 \right) \tag{III}$$

wherein $K_O$ (times) is expansion ratio of expanded particles before heat expansion, K (times) is expansion ratio of pre-expanded particles after heat expansion, $P_O$ [atm (abs)] is internal pressure of the expanded particles at room temperature (23° C.) just before heat expansion, T (t+273.2(° C.)) is heat expansion temperature and Tr (° C.) is room temperature (=23° C.) during measuring $P_O$.

That is, when the expansion ratio after heat expansion is the same as that before heat expansion ($K_O$=K), ε=0. Also, when cubic expansion of the expanded particles during the change from increased internal pressure by temperature of the given internal pressure of expanded particles to atmospheric pressure owing to the heat expansion is equal to cubic expansion of the expanded particles during the heat expansion, ε=1. Accordingly, when effect of an auxiliary blowing agent such as water, water vapor or alcohol is exhibited, there is possibility of ε>1.

In the case that the heat expansion temperature was too low, that is "t" was lower than "$T_L$–30" (T<$T_L$–30), expansion efficiency lowered ($\epsilon$<0.1). Accordingly, on the basis of the above equation (III), in order to increase K, $P_O$ must be heightened. It is not desired that $P_O$ is heightened because pressure during imparting expandability to the polyolefin resin expanded particles must be heightented or time for imparting expandability to the expanded particles must be lengthened.

It is not desired that "t" is higher than "$T_V$" because mutual fusion and/or open cell of the expanded particles are generated.

Thus, in the case that the heat expansion temperature "t" is within the temperature range represented by the inequality (II), there is realized the linear relation between the upper limit temperature (° C.) of "$t-T_V$" and the amount of the fusion preventing agent "C" (phr) being attached to the surface of the polyolefin resin expanded particles. That is, the relation represented by the inequality (I):

$$t-T_V \leq 49.1C-27.0 \tag{I}$$

is realized.

When the specific amount of the fusion preventing agent "C" being attached to the surface of the expanded particles is fixed, on the basis of the fixed "C" and "$T_V$", there is univocally fixed the upper limit of the temperature "t" at which excellent heat expansion can be carried out without mutual fusion of the expanded particles. The upper limit of the temperature "t" can be obtained in accordance with heat expansion evaluation experiment at heat temperature in several levels. The heat expansion evaluation experiment is carried out for respective several expanded particles. The several expanded particles show respective different values as to "$T_V$" and "C".

Figure 1:
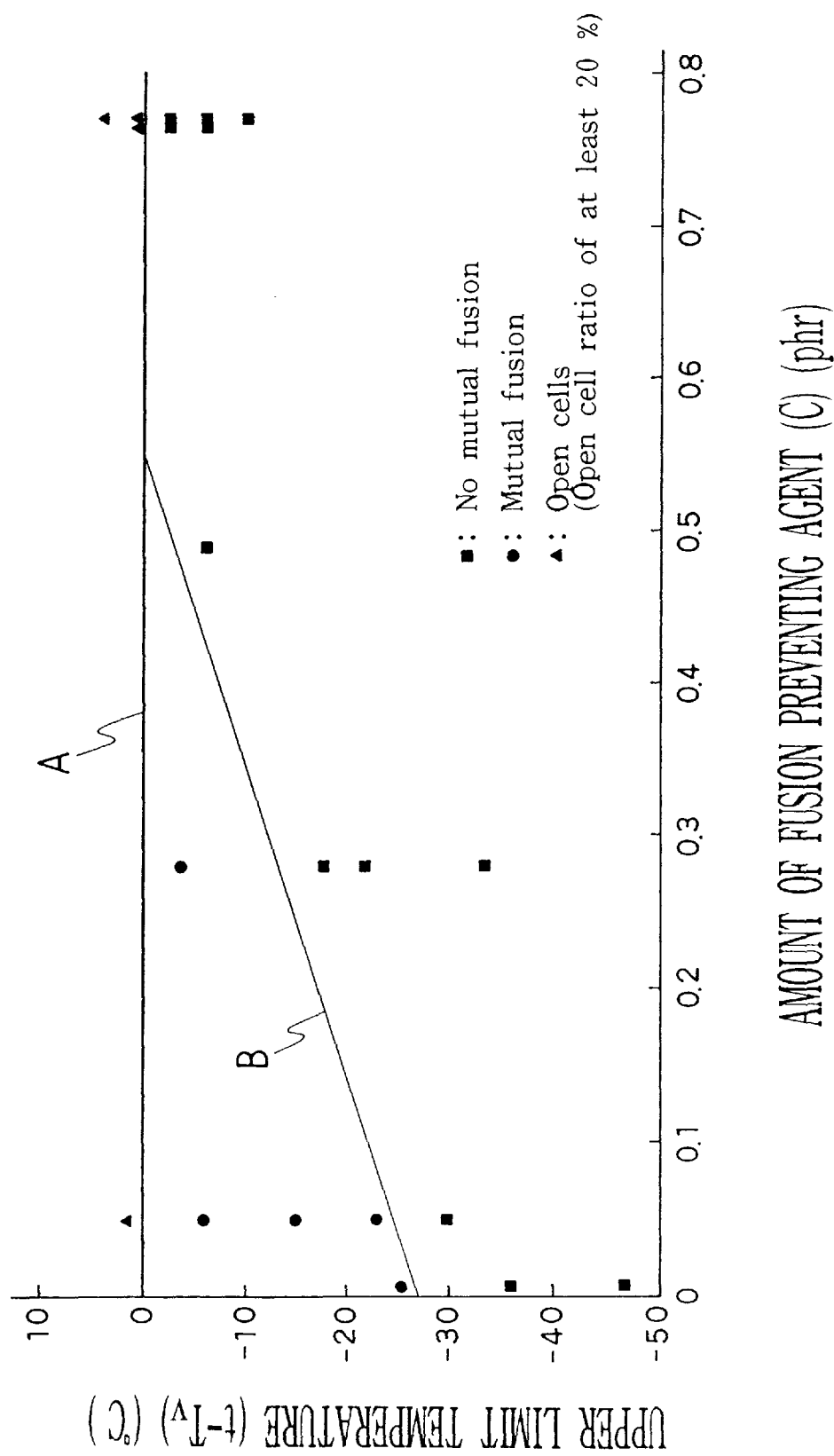
FIG. 1 is a diagram showing the relation between the amount of the fusion preventing agent (C) being attached to the surface of the polyolefin resin expanded particles and the upper limit temperature ($t-T_V$) at which expanded particles having expandability are heat expanded.

The relation between the above upper limit temperature "$t-T_V$" (° C.) and the amount of the fusion preventing agent "C" (phr) is shown in FIG. 1. As is clear from FIG. 1, the linear relation between "$t-T_V$" and "C" is realized. No mutual fusion was generated under the condition within the right lower area surrounded with open cell critical line A and fusion critical line B in FIG. 1. Accordingly this right lower area is preferable area. On the contrary, mutual fusion was generated under the condition within the left upper area in FIG. 1. Also, under the condition within the area satisfying the inequalities "$t-T_V$>0" and "$t-T_V$<49.1C-27.0" (area over the open cell critical line A), although mutual fusion of the expanded particles was not generated, open cell ratio of the obtained pre-expanded particles was higher than 20%.

As mentioned above, by adjusting the amount of the fusion preventing agent to be attached to the surface of the polyolefin resin expanded particles and the heat expansion temperature of the expanded particles having expandability so as to satisfy the conditions represented by the inequality (I) and the inequality (II), the polyolefin resin pre-expanded particles having high expansion ratio can be prepared with retaining closeness of cell and without generation of mutual fusion of expanded particles.

According to the process of the present invention, mutual fusion of expanded particles and increase of open cell ratio of pre-expanded particles owing to breaking of cell membrane during heat expansion can be prevented at the same time, heat expansion efficiency can be heightened, and polyolefin resin pre-expanded particles having high expansion ratio can be prepared.

The polyolefin resin pre-expanded particles prepared by the process of the present invention can be easily molded in accordance with conventionally known molding methods and suitably used for cushioning materials.

The process for preparing polyolefin resin pre-expanded particles of the present invention is more specifically described and explained by means of the following Examples. It is to be understood that the present invention is not limited to the Examples, and various changes and modifications may be made in the invention without departing from the spirit and scope thereof.

Melting point and melting finishing temperature of polyolefin resin (base resin) used in the following Examples and Comparative Examples were measured as follows. Base resin particles in an amount of about 1 to 10 mg were exactly weighed and subjected to differential scanning calorimetry with raising the temperature thereof from room temperature to 220° C. at a rate of 10° C./min. by using differential scanning calorimeter SSC5200 commercially available from Seiko Instruments Inc. to give a DSC curve. Endothermic peak in the DSC curve was defined as melting point. Melting finishing temperature was measured in accordance with a method described in Japanese Unexamined Patent Publication No. 23428/1985.

Example 1 and Comparative Examples 1 to 4

Into a single screw extruder (50 mmø, L/D=3) were fed ethylene-propylene random copolymer (melting point: 137° C., melting finishing temperature: 157° C.) as a polyolefin resin and talc in an amount of 0.005 phr as an expansion nucleating agent to give resin particles for expansion in a particle weight of about 1.8 mg.

Into a first closed container were fed 100 parts of the obtained resin particles for expansion, 300 parts of water, 1.4 parts of tricalcium phosphate as a fusion preventing agent and 0.03 part of sodium n-paraffinsulfonate as an auxiliary dispersant. Then, thereto was added 13 parts of isobutane as a blowing agent, and the resin particles for expansion were expanded through a circular orifice having a diameter of 4 mm under the condition at expansion temperature of 138° C. and expansion pressure of 17 kg/cm²(G) to give polyolefin resin expanded particles.

As properties of the obtained polyolefin resin expanded particles, expansion ratio and average cell diameter were measured in accordance with the following methods. As a result, the polyolefin resin expanded particles were expanded particles having an expansion ratio of 11.3 times, an average cell diameter of 300 μm and a closed cell structure.

The polyolefin resin expanded particles showed two melting points in a DSC curve obtained by differential scanning calorimetry using the differential scanning calorimeter SSC5200 commercially available from Seiko Instruments Inc. and had a special crystal structure. As to $T_L$, $T_V$ and $T_H$ in the DSC curve, $T_L$, $T_V$ and $T_H$ were 136.8° C., 149.4° C. and 156.7° C, respectively.

The polyolefin resin expanded particles were sufficiently washed with hydrochloric acid showing pH 3 and water, and dried. Then, the amount of the fusion preventing agent being attached to the surface of the dried expanded particles was measured in accordance with the following method. As a result, the amount of the fusion preventing agent was 0.05 phr. Then, this expanded particles were fed into a second closed container, and the internal pressure of the second closed container was adjusted to 5 kg/cm²(G) with air. The expanded particles were allowed to stand at room temperature for about 24 hours, and expandability was imparted to the expanded particles. After the obtained expanded particles having expandability were taken out from the second closed container, decreasing speed coefficient of internal pressure was measured. The decreasing speed coefficient of internal pressure was 0.15. The internal pressure at 23° C. of the expanded particles having expandability just before heat expansion was 3.9 atm (abs).

After the above expanded particles having expandability were fed into a third closed container, heat expansion was carried out under the condition shown in Table 1 to give polyolefin resin pre-expanded particles.

As properties of the obtained polyolefin resin pre-expanded particles, expansion ratio, expansion efficiency, open cell ratio and mutual fusion were examined in accordance with the following methods. The results are shown in Table 1.

[Polyolefin resin expanded particles]
(1) Expansion ratio ($K_O$)

Expanded particles in an amount of about 2 g were exactly weighed and volume of the expanded particles was measured by a dipping method with water. True specific gravity of the expanded particles was calculated. Then, the expansion ratio "$K_O$" of the expanded particles was calculated by dividing the true specific gravity of the resin (composition) by the true specific gravity of the expanded particles.

(2) Average cell diameter

Average cell diameter of the expanded particles was measured by observing the cross section of the expanded particles with a microscope.

(3) Amount of a fusion preventing agent (tricalcium phosphate) being attached to the surface of the expanded particles (C)

To a conical beaker were added 50.0 ml of an aqueous solution (calorimetric solution) containing 0.022% by weight of ammonium metavanadate, 0.54% by weight of ammonium molybdate and 3% by weight of nitric acid, and "W" (g) of the expanded particles. They were stirred for one minute and then, allowed to stand for 10 minutes. The liquid phase in the obtained mixture was poured into a fused silica cell having an optical path length of 1.0 cm, and absorbance "A" of the liquid phase was measured at a wavelength of 410 nm by a spectrophotometer.

Using the same calorimetric solution as mentioned above, absorptivity "$\mu$" (g/L cm) of tricalcium phosphate had been previously measured at a wavelength of 410 nm. On the bases of "$\mu$", "A", "W", the amount of the fusion preventing agent "C" (phr) was calculated in accordance with the following equation.

$$C(\text{phr}) = \frac{5\mu A}{W}$$

[Polyolefin resin pre-expanded particles]
(1) Expansion ratio (K)

Expansion ratio "K" of the pre-expanded particles was calculated in the same manner as the expansion ratio "$K_O$" of the above polyolefin resin expanded particles.

(2) Expansion efficiency ($\epsilon$)

Expansion efficiency "$\epsilon$" of the pre-expanded particles was calculated in accordance with the following equation (III):

$$\frac{K - K_o}{K_o} = \epsilon \left( P_o \frac{T}{Tr} - 1 \right) \quad \text{(III)}$$

wherein $K_O$, K, $P_O$, T and $T_r$ were the same as defined above, respectively.

(3) Open cell ratio

Closed cell volume of the pre-expanded particles was measured by using air comparative hydrometer 1000 type commercially available from TOKYO SCIENCE INC. Then, closed cell ratio (%) of the pre-expanded particles was calculated by dividing the closed cell volume by apparent volume of the pre-expanded particles previously measured by the dipping method with water. Open cell ratio (%) was calculated by subtracting the closed cell ratio from 100.

(4) Mutual fusion

The existence of mutual fusion was examined by observing the pre-expanded particles with the naked eyes.

Example 2

Polyolefin resin pre-expanded particles were prepared in the same manner as in Comparative Example 3 except that the amount of the fusion preventing agent was changed from 1.4 parts to 2.5 parts, the obtained polyolefin resin expanded particles just after expansion through the orifice of the first closed container were sufficiently washed with water, and the polyolefin resin expanded particles were not washed with hydrochloric acid.

The properties of the polyolefin resin expanded particles and polyolefin resin pre-expanded particles were examined in the same manner as in Example 1. The results are shown in Table 1.

Examples 3 to 5 and Comparative Example 5

Polyolefin resin pre-expanded particles were prepared in the same manner as in Example 1 except that ethylene-propylene random copolymer (melting point: 145° C., melting finishing temperature: 161° C.) was used as a polyolefin resin instead of the random copolymer used in Example 1, the amount of talc was changed from 0.005 phr to 0.01 phr and the polyolefin resin expanded particles were not washed with hydrochloric acid. The internal pressure at 23° C. of the expanded particles having expandability just before heat expansion was 4.3 atm (abs).

The properties of the polyolefin resin expanded particles and polyolefin resin pre-expanded particles were examined in the same manner as in Example 1. The results are shown in Table 1.

Example 6 and Comparative Examples 6 to 7

To 100 parts of a resin mixture containing 98% by weight of the ethylene-propylene random copolymer used in Examples 3 to 5 and Comparative Example 5, as a polyolefin resin, and 2% by weight of HIMILAN™ #1707 commercially available from MITSUI-DUPONT POLYCHEMICAL INC., as an ethylene ionomer, was added 1 part of talc. The obtained mixture was fed into the single screw extruder used in Example 1 to give resin particles for expansion. The melting point and the melting finishing temperature of the resin particles for expansion were 147° C. and 159C., respectively.

Then, polyolefin resin expanded particles were prepared in the same manner as in Example 1 except that the blowing agent was changed from isobutane to water, the expansion temperature was changed from 138° C. to 155° C. and the expansion pressure was changed from 17 kg/cm² (G) to 30 kg/cm² (G) (pressed with nitrogen gas) when the resin particles for expansion were expanded through the orifice of the first closed container. The polyolefin resin expanded particles were expanded particles having an expansion ratio of 9.8 times and an average cell diameter of 150 μm. As to $T_L$ and $T_V$ in the DSC curve of the polyolefin resin expanded particles, $T_L$ and $T_V$ were 143.5° C. and 155.6° C., respectively.

The polyolefin resin expanded particles were sufficiently washed with hydrochloric acid showing pH 1 and fed into the second closed container. The internal pressure of the second closed container was adjusted to 8 kg/cm² (G) with nitrogen gas. The expanded particles were allowed to stand in water bath at 80° C. for 3 hours, and expandability was imparted to the expanded particles. The decreasing speed coefficient of internal pressure of the expanded particles having expandability was 1.7. The internal pressure at 23° C. of the expanded particles having expandability just before heat expansion was 5.0 atm (abs).

After the above expanded particles having expandability were fed into the third closed container, heat expansion was carried out under the condition shown in Table 1 to give polyolefin resin pre-expanded particles.

The properties of the polyolefin resin expanded particles and polyolefin resin pre-expanded particles were examined in the same manner as in Example 1. The results are shown in Table 1.

Examples 7 to 8 and Comparative Example 8

Resin particles for expansion were prepared in the same manner as in Example 1 except that linear low density polyethylene (melting point: 120° C., melting finishing temperature: 132° C.) was used as a polyolefin resin instead of ethylene-propylene random copolymer and the amount of talc was changed from 0.005 phr to 0.01 phr.

Then, polyolefin resin expanded particles were prepared in the same manner as in Example 1 except that the blowing agent was changed from isobutane to water, the expansion temperature was changed from 138° C. to 125° C., the expansion pressure was changed from 17 kg/cm² (G) to 35 kg/cm² (G) (pressed with air) and the amount of tricalcium phosphate as a fusion preventing agent was changed from 1.4 parts to 4.0 parts when the resin particles for expansion were expanded through the orifice of the first closed container.

Then, into the second closed container were fed the polyolefin resin expanded particles without washing, and the internal pressure of the second closed container was adjusted to 8 kg/cm² (G) with air. The expanded particles were allowed to stand at room temperature for 18 hours, and expandability was imparted to the expanded particles. The decreasing speed coefficient of internal pressure of the expanded particles having expandability was 0.15. The internal pressure at 23° C. of the expanded particles having expandability just before heat expansion was 5.0 atm (abs).

After the above expanded particles having expandability were fed into the third closed container, heat expansion was carried out under the condition shown in Table 1 to give polyolefin resin pre-expanded particles.

The properties of the polyolefin resin expanded particles and polyolefin resin pre-expanded particles were examined in the same manner as in Example 1. The results are shown in Table 1.

The DSC curve of the polyolefin resin expanded particles used in Examples 7 to 8 and Comparative Example 8, which was obtained by the differential scanning calorimetry is shown in FIG. 2.

Examples 9 to 11 and Comparative Examples 9 to 10

To 100 parts of a resin mixture containing 95% by weight of the linear low density polyethylene used in Examples 7 to 8 and Comparative Example 8, as a polyolefin resin, and 5% by weight of HIMILAN™ #1856 commercially available from MITSUI-DUPONT POLYCHEMICAL INC., as an ethylene ionomer, was added 0.1 part of talc. The obtained mixture was fed into the single screw extruder used in Example 1 to give resin particles for expansion.

Then, using the above resin particles for expansion, polyolefin resin expanded particles were prepared in the same manner as in Examples 7 to 8 and Comparative Example 8. The polyolefin resin expanded particles were expanded particles having an expansion ratio of 3.1 times, an average cell diameter of 160 μm and a closed cell structure. As to $T_L$ and $T_V$ in the DSC curve of the polyolefin resin expanded particles, $T_L$ and $T_V$ were 108.6° C. and 118.7° C., respectively.

Expandability was imparted to the polyolefin resin expanded particles in the same manner as in Examples 7 to 8 and Comparative Example 8, and the obtained expanded particles having expandability were heat expanded under the condition shown in Table 1 to give polyolefin resin pre-expanded particles.

The properties of the polyolefin resin expanded particles and polyolefin resin pre-expanded particles were examined in the same manner as in Example 1. The results are shown in Table 1.

In Table 1, "$T_L$" and "$T_V$" of every polyolefin resin expanded particles, "t–$T_L$" and "t–$T_V$" are shown.

TABLE 1

| | Properties of polyolefin resin expanded particles | | | | | Condition of heat expansion | |
|---|---|---|---|---|---|---|---|
| Example No. | $T_L$(°C.) | $T_V$(°C.) | Expansion ratio $K_O$(times) | Average cell diameter (μm) | Amount of fusion preventing agent C (phr) | Heat vapor pressure (kg/cm²(G)) | Heat temperature t (°C.) |
| Ex. 1 | 136.8 | 149.4 | 11.3 | 300 | 0.05 | 1.0 | 119.6 |
| Com. Ex. 1 | 136.8 | 149.4 | 11.3 | 300 | 0.05 | 1.5 | 126.4 |
| 2 | 136.8 | 149.4 | 11.3 | 300 | 0.05 | 2.15 | 134.5 |
| 3 | 136.8 | 149.4 | 11.3 | 300 | 0.05 | 3.05 | 143.5 |
| 4 | 136.8 | 149.4 | 11.3 | 300 | 0.05 | 4.00 | 151.1 |
| Ex. 2 | 136.8 | 149.4 | 11.3 | 300 | 0.49 | 3.05 | 143.5 |
| Ex. 3 | 140.4 | 154.6 | 9.2 | 320 | 0.28 | 1.1 | 121.1 |
| 4 | 140.4 | 154.6 | 9.2 | 320 | 0.28 | 2.0 | 132.9 |
| 5 | 140.4 | 154.6 | 9.2 | 320 | 0.28 | 2.4 | 136.9 |
| Com. Ex. 5 | 140.4 | 154.6 | 9.2 | 320 | 0.28 | 4.0 | 151.1 |
| Ex. 6 | 143.5 | 155.6 | 9.8 | 150 | 0.006 | 1.0 | 119.6 |
| Com. Ex. 6 | 143.5 | 155.6 | 9.8 | 150 | 0.006 | 0.4 | 108.7 |
| 7 | 143.5 | 155.6 | 9.8 | 150 | 0.006 | 1.8 | 130.2 |

TABLE 1-continued

| Ex. 7 | 108.6 | 118.7 | 3.8 | 100 | 0.765 | 0.6 | 112.7 |
| 8 | 108.6 | 118.7 | 3.8 | 100 | 0.765 | 0.8 | 116.3 |
| Com. Ex. 8 | 108.6 | 118.7 | 3.8 | 100 | 0.765 | 1.0 | 119.6 |
| Ex. 9 | 108.6 | 118.7 | 3.1 | 160 | 0.771 | 0.4 | 108.7 |
| 10 | 108.6 | 118.7 | 3.1 | 160 | 0.771 | 0.6 | 112.7 |
| 11 | 108.6 | 118.7 | 3.1 | 160 | 0.771 | 0.8 | 116.3 |
| Com. Ex. 9 | 108.6 | 118.7 | 3.1 | 160 | 0.771 | 1.0 | 119.6 |
| 10 | 108.6 | 118.7 | 3.1 | 160 | 0.771 | 1.2 | 122.7 |

| | | | Properties of polyolefin resin pre-expanded particles | | | |
|---|---|---|---|---|---|---|
| Example No. | $t-T_L$ (°C.) | $t-T_V$ (°C.) | Expansion ratio K (times) | Expansion efficiency $\epsilon$ (-) | Open cell ratio (%) | Mutual fusion |
| Ex. 1 | −17.2 | −29.8 | 21.3 | 0.21 | 0.7 | None |
| Com. Ex. 1 | −10.4 | −23.0 | 26.1 | 0.30 | 0.7 | Existence |
| 2 | −2.3 | −14.9 | 34.0 | 0.46 | 0.9 | Existence |
| 3 | +6.7 | −5.9 | 42.2 | 0.61 | 1.6 | Existence |
| 4 | +14.3 | +1.7 | 53.1 | 0.81 | 25.1 | Existence |
| Ex. 2 | +6.7 | −5.9 | 45.0 | 0.66 | 1.5 | None |
| Ex. 3 | −19.2 | −33.4 | 18.5 | 0.21 | 0.9 | None |
| 4 | −7.5 | −21.7 | 31.6 | 0.50 | 1.1 | None |
| 5 | −3.5 | −17.7 | 47.2 | 0.82 | 6.3 | None |
| Com. Exp. 5 | +10.7 | −3.5 | 54.7 | 0.96 | 17.4 | Existence |
| Ex. 6 | −23.9 | −36.0 | 14.5 | 0.15 | 1.0 | None |
| Com. Ex. 6 | −34.8 | −46.9 | 10.5 | 0.07 | 0.2 | None |
| 7 | −13.3 | −25.4 | 19.4 | 0.22 | 1.6 | Existence |
| Ex. 7 | +4.1 | −6.0 | 22.7 | 0.90 | 6.4 | None |
| 8 | +7.7 | −2.4 | 24.6 | 1.16 | 9.2 | None |
| Com. Ex. 8 | +11.0 | +0.9 | 24.8 | 1.16 | 41.7 | None |
| Ex. 9 | +0.1 | −10.0 | 10.5 | 0.43 | 11.6 | None |
| 10 | +4.1 | −6.0 | 12.4 | 0.54 | 11.7 | None |
| 11 | +7.7 | −2.4 | 16.7 | 0.78 | 12.8 | None |
| Com. Ex. 9 | +11.0 | +0.9 | 19.2 | 0.92 | 21.1 | None |
| 10 | +14.1 | +4.0 | 22.5 | 1.10 | 30.7 | None |

From the results shown in Table 1, the following can be understood.

(1) Comparison between Example 1 and Comparative Examples 1 to 4

In the case that t, $T_V$ and C satisfy the relation represented by the inequality (I), and t, $T_V$ and $T_L$ satisfy the relation represented by the inequality (II) as in Example 1, there can be prepared excellent pre-expanded particles having high expansion ratio, high expansion efficiency and low open cell ratio, and showing no mutual fusion. On the contrary, in the case that t, $T_V$ and C do not satisfy the relation represented by the inequality (I) as in Comparative Examples 1 to 3, mutual fusion is generated. Also, in the case that t, $T_V$ and C do not satisfy the relation represented by the inequality (I), and t, $T_V$, and TL do not satisfy the relation represented by the inequality (II) as in Comparative Example 4, mutual fusion is generated and open cell ratio becomes extremely high.

It can be understood that when the amount of the fusion preventing agent being attached to the surface of the expanded particles is little such as 0.05 phr, mutual fusion of the expanded particles is generated at relatively low heat temperature, so that it is impossible to heighten heat expansion temperature.

(2) Comparison between Example 2 and Comparative Example 3

In the case that C is increased to 0.49 phr, t, $T_V$ and C satisfy the relation represented by the inequality (I), and t, $T_V$ and $T_L$ satisfy the relation represented by the inequality (II) as in Example 2, there can be prepared excellent pre-expanded particles having high expansion ratio, high expansion efficiency and low open cell ratio, and showing no mutual fusion.

(3) Comparison between Examples 3 to 5 and Comparative Example 5

In the case that t, $T_V$ and C satisfy the relation represented by the inequality (I), and t, $T_V$ and $T_L$ satisfy the relation represented by the inequality (II) as in Examples 3 to 5, there can be prepared excellent pre-expanded particles having high expansion ratio, high expansion efficiency and low open cell ratio, and showing no mutual fusion. On the contrary, in the case that t, $T_V$ and C do not satisfy the relation represented by the inequality (I) as in Comparative Example 5, mutual fusion is generated.

It can be understood that when the amount of the fusion preventing agent being attached to the surface of the expanded particles is much such as 0.28 phr, mutual fusion of the expanded particles is not generated till the expansion temperature is heightened to relatively high temperature, so that it is possible to heighten expansion efficiency and expansion ratio.

(4) Comparison between Example 6 and Comparative Examples 6 to 7

In the case that t, $T_V$ and C satisfy the relation represented by the inequality (I), and t, $T_V$ and $T_L$ satisfy the relation represented by the inequality (II) as in Example 6, there can be prepared excellent pre-expanded particles having high expansion ratio, high expansion efficiency and low open cell ratio, and showing no mutual fusion. On the contrary, in the case that t, $T_V$ and $T_L$ do not satisfy the relation represented by the inequality (II) as in Comparative Example 6, expansion efficiency remarkably lowers. Also, in the case that t, $T_V$ and C do not satisfy the relation represented by the inequality (I) as in Comparative Example 7, mutual fusion is generated.

It can be understood that when the amount of the fusion preventing agent being attached to the surface of the expanded particles is too little during heat expansion, mutual fusion of the expanded particles is easily generated, so that suitable range of heat temperature becomes narrow.

(5) Comparison between Examples 7 to 8 and Comparative Example 8

In the case that t, $T_V$ and C satisfy the relation represented by the inequality (I), and t, $T_V$ and $T_L$ satisfy the relation represented by the inequality (II) as in Examples 7 to 8, there can be prepared excellent pre-expanded particles having high expansion ratio, high expansion efficiency and low open cell ratio, and showing no mutual fusion. On the contrary, in the case that heat temperature is too high, and t, $T_V$ and $T_L$ do not satisfy the relation represented by the inequality (II) as in Comparative Example 8, open cell ratio becomes remarkably high such as 41.7%, so that the pre-expanded particles are not expanded particles having a closed cell structure.

In the case that the amount of the fusion preventing agent is much such as 0.765 phr as in Examples 7 to 8 and Comparative Example 8, molding fusion property during internal die mold lowers. Accordingly, in Examples 7 to 8 and Comparative Example 8, the polyolefin resin expanded particles were sufficiently washed with the acidic aqueous solution before internal die mold so that the amount of the fusion preventing agent during internal die mold is at most 0.3 phr.

(6) Comparison between Examples 9 to 11 and Comparative Examples 9 to 10

In the case that t, $T_V$ and C satisfy the relation represented by the inequality (I), and t, $T_V$ and $T_L$ satisfy the relation represented by the inequality (II) as in Examples 9 to 11, there can be prepared excellent pre-expanded particles having high expansion ratio, high expansion efficiency and low open cell ratio, and showing no mutual fusion. On the contrary, in the case that heat temperature is too high, and t, $T_V$ and $T_L$ do not satisfy the relation represented by the inequality (II) as in Comparative Examples 9 to 10, open cell ratio becomes remarkably high such as higher than 20%, so that the pre-expanded particles are not expanded particles having a closed cell structure.

It can be understood that when the amount of the fusion preventing agent being attached to the surface of the expanded particles is much such as 0.771 phr as in Examples 9 to 11, mutual fusion of the expanded particles is not generated at each level, so that expansion efficiency of the pre-expanded particles can be fixed at about 0.4 to 0.8 and expansion ratio of the pre-expanded particles can be suitably adjusted.

In the case that the amount of the fusion preventing agent is much such as 0.771 phr as in Examples 9 to 11 and Comparative Examples 9 to 10, molding fusion property during internal die mold lowers. Accordingly, in Examples 9 to 11 and Comparative Examples 9 to 10, the polyolefin resin expanded particles were sufficiently washed with the acidic aqueous solution before internal die mold so that the amount of the fusion preventing agent during internal die mold is at most 0.3 phr.

In addition to the ingredients used in the Examples, other ingredients can be used in the Examples as set forth in the specification to obtain substantially the same results.

What is claimed is:

1. A process for preparing polyolefin resin pre-expanded particles comprising imparting expandability to polyolefin resin expanded particles having a crystal structure which shows two melting points in a DSC curve obtained by a differential scanning calorimetry and then, heat expanding expanded particles having expandability, which is characterized in that the relation between heat expansion temperature of said expanded particles having expandability and the amount of a fusion preventing agent being attached to the surface of said polyolefin resin expanded particles is represented by the inequality (I):

$$t - T_V \leq 49.1C - 27.0 \tag{I}$$

wherein t (°C.) is heat expansion temperature, C (phr) is the amount of the fusion preventing agent being attached to the surface of the polyolefin resin expanded particles and $T_V$ (°C.) is saddle temperature between two peaks showing two respective melting points in the DSC curve, and said heat expansion temperature is within the temperature range represented by the inequality (II):

$$T_L - 30 \leq t \leq T_V \tag{I}$$

wherein t (°C.) is heat expansion temperature, $T_V$ (°C.) is saddle temperature between two peaks showing two respective melting points in the DSC curve and $T_L$ (°C.) is lower melting point of the two melting points.

2. The process of claim 1, wherein the amount of said fusion preventing agent being attached to the surface of said polyolefin resin expanded particles is 0.001 to 0.3 phr.

3. The process of claim 1, wherein said fusion preventing agent mainly consists of tricalcium phosphate.

4. The process of claim 2, wherein said fusion preventing agent mainly consists of tricalcium phosphate.

* * * * *